April 10, 1934.   N. RIPPEN   1,954,599
PLATE AND FRAME ASSEMBLING MEANS
Filed May 26, 1932
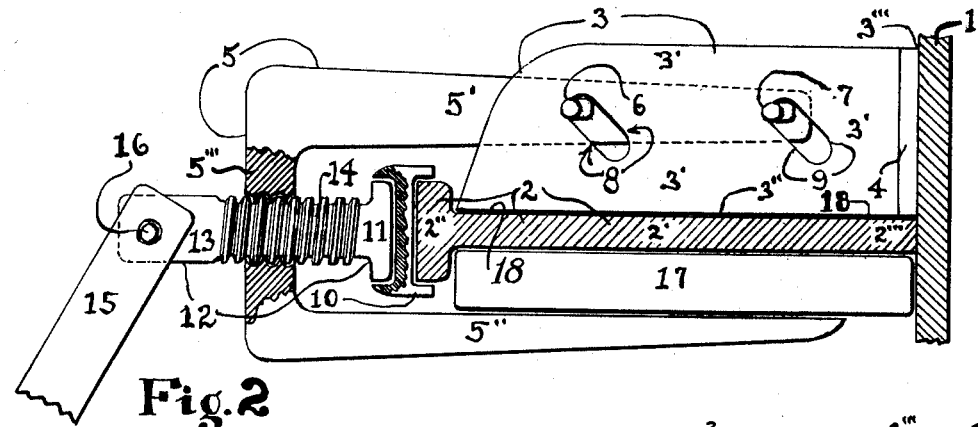
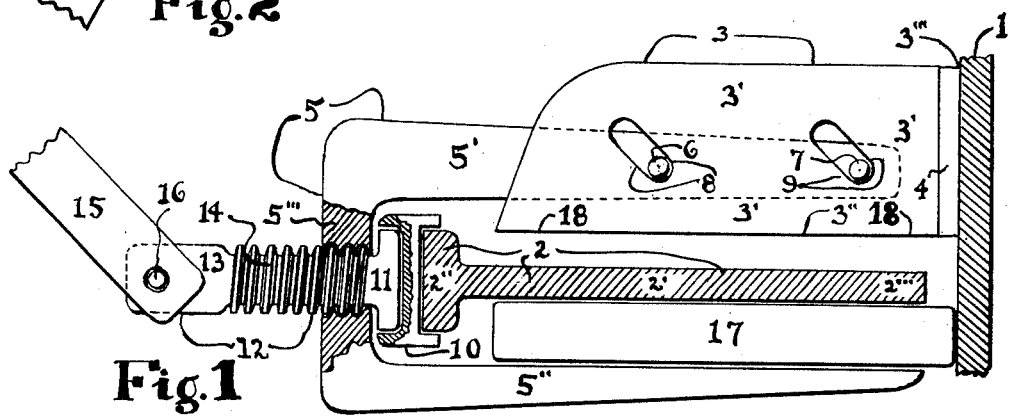
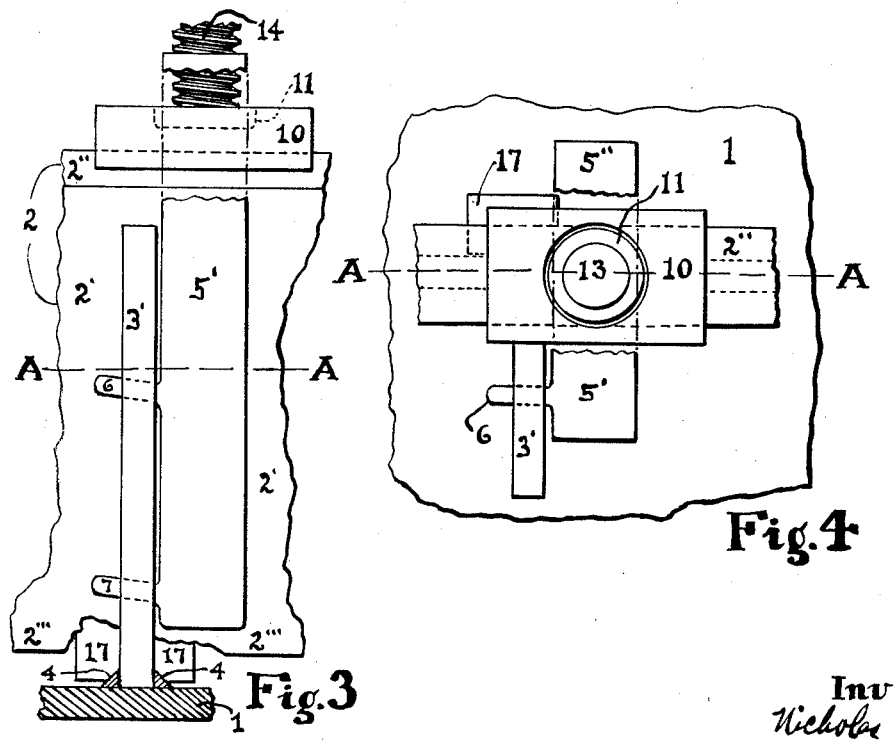
Inventor:
Nicholas Rippen Patented Apr. 10, 1934

1,954,599

UNITED STATES PATENT OFFICE 1,954,599

PLATE-AND-FRAME-ASSEMBLING MEANS

Nicholas Rippen, New York, N. Y.

Application May 26, 1932, Serial No. 613,648

3 Claims. (Cl. 113—99)

My invention relates to methods and means of forcing flat metal members into close contact with adjacent frames and both of them with brackets for quicker, cheaper and more exact relative positioning thereof and welding of them together.

A description thereof follows, aided by accompanying drawing.

Figure 1 illustrates, partly in full and partly in cross-sectional end view, a plate, a frame adjacent thereto, a special bracket and a clamping means embodying my invention previously to bringing the various parts into welding contact.

Figure 2 illustrates, in the same view, the same parts subsequently to their having been brought into desired welding contact.

Figure 3 illustrates the same parts, partly in full and partly in cross-sectional side view, previously to bringing them into welding contact.

Figure 4 illustrates the same parts, in plan view, previously to bringing them into welding contact.

In Figure 1 is seen bracket 3 welded to plate 1, to which is disposed adjacent thereto frame 2, embraced by the clamping means comprising a two-legged or U-shaped member 5, having a guiding leg 5", an anchoring leg 5', a web 5''' connecting them and being threaded to accommodate a clamping screw 14 extending therethrough, said web being disposed at the ends of the legs opposite to the open ends of them, said anchoring leg being provided with cam studs 6 and 7. For positioning frame 2 in assembled position preparatory to welding it and for assuring its proper alinement, bracket 3 is provided with oblique or inclined cam holes 8 and 9 adapted to respectively cooperate with cam studs 6 and 7. Bracket 3 is welded, along one edge 3''' thereof to said plate, another edge 3" of the bracket functioning as a positioning and alining means for the frame. Frame 2 is placed in the approximate position for welding, its main portion 2' being disposed between edge 3" of said bracket, while clamp 5 is disposed with its cam studs 6 and 7 respectively within cam holes 8 and 9 and guiding leg 5" is opposite to the side of the frame on which is found the bracket, a spacer 17 being disposed between the frame and the guiding leg. With the pressure-end 11 of clamp screw 14 rotatably mounted in a corresponding recess in bearing member 11, the plate, the frame and the bracket are then brought into the position shown in Figure 2 by the movement of the cam studs in the cam holes and the screwing of the clamp screw, although pressure-end 11 may be permitted to bear directly against flanged head 2" of the frame. While in this position frame 2 is secured to plate 1 by welds 4 and to edge 3''' of the bracket, after which the clamp is removed. The frame may have its head otherwise flanged or entirely unflanged. The screw is manipulated by the pivoted handle 15 mounted thereon.

The bracket may be rectangularly or obliquely disposed to the plate. It may have a single cam hole, provided it is sufficiently widely flanged to prevent pivoting of the clamp about head 2". The plural type of cam holes and studs is preferable.

Briefly stated, the function of the device is to locate and clamp a frame in contact with a plate and an adjacent frame for welding. This function is accomplished by providing cam holes, which may be of a shape quite different from that shown in the drawing, in the bracket, then welding it to the plate, then placing the frame in its approximate position on the plate near the bracket (of which it will be understood there will usually be several for each frame), and then positioning the clamping means over the frame near the brackets, the cam studs sliding in the cam holes during the screwing down of the clamping screw 14.

The combination of the U-shaped or two legged member 5, the bracket 3, the spacer 17 and bearing member 10 if either one or both of them are necessary, the clamping screw 14 or its mechanical equivalent, also termed pressure means, and the mutually cooperating cam hole and cam stud, constitutes a plate-and-frame-assembling means.

I claim:

1. A plate-and-frame-assembling means comprising a bracket having therein at least one cam hole and being welded to said plate, and a two-legged clamping means embracing said frame with a guiding leg of said clamping means on one side of said frame and an anchoring leg of said clamping means on the other side of said frame, said anchoring leg being provided with at least one cam stud cooperating with said cam hole, said assembling means comprising also a pressure means adapted to force said frame into welding contact with said plate and with said bracket.

2. A plate-and-frame-assembling means comprising a bracket having therein at least one cam hole and being welded to said plate, and a two-legged clamping means embracing said frame with a guiding leg of said clamping means on one side of said frame and an anchoring leg of said clamping means on the other side of said frame, said clamping means comprising a web connecting said legs, said anchoring leg being provided with at least one cam stud adapted to cooperate with said cam hole, said assembling means comprising also a pressure means adapted to force said frame into welding contact with said plate and said bracket and disposed at said web.

3. A plate-and-frame assembling means comprising a bracket having therein at least one cam hole and being welded to said plate, and a two-legged clamping means embracing said frame with a guiding leg of said clamping means on one side of said frame and an anchoring leg of said clamping means on the other side of said frame and comprising a web connecting said legs, said anchoring leg being provided with at least one cam stud adapted to cooperate with said cam hole, a clamping screw adjustably threading through said web and adapted to force said frame into welding contact with said plate and said bracket.

NICHOLAS RIPPEN.